(12) United States Patent
Wang (10) Patent No.: US 12,462,430 B2
(45) Date of Patent: Nov. 4, 2025

(54) HEAD-MOUNTED VIRTUAL REALITY DEVICE

(71) Applicant: Beijing Zitiao Network Technology Co., Ltd., Beijing (CN)

(72) Inventor: Qiang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 243 days.

(21) Appl. No.: 18/463,203

(22) Filed: Sep. 7, 2023

(65) Prior Publication Data

US 2024/0078707 A1 Mar. 7, 2024

(30) Foreign Application Priority Data

Sep. 7, 2022 (CN) .......................... 202211091839.1

(51) Int. Cl.
*H04N 23/56* (2023.01)
*G06T 7/73* (2017.01)
*G06T 7/80* (2017.01)
*H04N 23/90* (2023.01)

(52) U.S. Cl.
CPC ................. *G06T 7/80* (2017.01); *G06T 7/73* (2017.01); *H04N 23/56* (2023.01); *H04N 23/90* (2023.01); *G06T 2207/30201* (2013.01)

(58) Field of Classification Search
CPC ....................... H04N 23/56; G06T 2207/30201
See application file for complete search history.

(56) References Cited

U.S. PATENT DOCUMENTS

| 2015/0131054 A1* | 5/2015 | Wuellner ............. A61B 3/1005 |
| | | 351/205 |
| 2016/0157716 A1* | 6/2016 | Pamplona ................ A61B 3/18 |
| | | 351/213 |
| 2018/0003962 A1* | 1/2018 | Urey .................. G02B 27/0093 |
| 2022/0175246 A1* | 6/2022 | Moriguchi ........... A61B 3/0025 |

FOREIGN PATENT DOCUMENTS

| CN | 112106066 A | 12/2020 |
| WO | 2021108327 A1 | 6/2021 |

* cited by examiner

*Primary Examiner* — Jayanti K Patel
*Assistant Examiner* — Christopher Kingsbury Glover
(74) *Attorney, Agent, or Firm* — Alleman Hall & Tuttle LLP (57) ABSTRACT

The present disclosure provides a head-mounted virtual reality device, including an eye movement recognition assembly and a processor, where the eye movement recognition assembly includes a light source assembly and a first camera; the light source assembly includes a light source and a diffractive optical element, where the diffractive optical element is provided with a plurality of light-emitting holes, a first pattern is formed by the plurality of light-emitting holes, and the light source assembly is configured such that a first reflected pattern on an eyeball of a user is formed by light emitted by the light source assembly when the head-mounted virtual reality device is used; the first camera is configured to photograph a first eye picture of a user when the head-mounted virtual reality device is used, and the first eye picture includes at least part of the first reflected pattern.

17 Claims, 7 Drawing Sheets

HEAD-MOUNTED VIRTUAL REALITY DEVICE

CROSS-REFERENCE TO RELATED APPLICATION

The present application claims priority to Chinese Patent Application No. 202211091839.1, titled "HEAD-MOUNTED VIRTUAL REALITY DEVICE", filed to China National Intellectual Property Administration on Sep. 7, 2022, which is hereby incorporated by reference in its entirety.

TECHNICAL FIELD

Embodiments of the present disclosure relate to the technical field of virtual reality and, in particular, to a head-mounted virtual reality device.

BACKGROUND

With the development of virtual reality (VR) technology and the increasing popularity of head-mounted virtual reality devices in daily lives, people can experience virtual scenes and enjoy immersive experience by wearing the head-mounted virtual reality devices, which greatly enriches people's lives and improves their life quality.

The head-mounted virtual reality device is a product that combines simulation technology with computer graphics, human-machine interface technology, multimedia technology, sensing technology, network technology and other technology. It is a brand-new means of human-machine interaction created with the help of computers and the latest sensor technology. In the related art, the head-mounted virtual reality device includes an eyeball tracking apparatus, so that the head-mounted virtual reality device can determine a viewing direction and an interpupillary distance of a user according to the user's eyeball position.

However, the above-mentioned eye tracking apparatus has the problems of high calibration complexity and low calibration accuracy.

SUMMARY

Embodiments of the present disclosure provide a head-mounted virtual reality device, to solve the technical problems of high calibration complexity and low calibration accuracy in the scheme that a plurality of infrared emitting diodes cooperate with an infrared camera to realize eye movement recognition of the head-mounted virtual reality device.

Embodiments of the present disclosure provide the following technical solutions to solve the above technical problems.

Embodiments of the present disclosure provides a head-mounted virtual reality device, including an eye movement recognition assembly and a processor, where the eye movement recognition assembly includes a light source assembly and a first camera;

the light source assembly includes a light source and a diffractive optical element, where the diffractive optical element is provided with a plurality of light-emitting holes, a first pattern is formed by the plurality of light-emitting holes, and the light source assembly is configured such that a first reflected pattern on an eyeball of a user is formed by light emitted by the light source assembly when the head-mounted virtual reality device is used;

the first camera is configured to photograph a first eye picture of a user when the head-mounted virtual reality device is used, and the first eye picture includes at least part of the first reflected pattern; and the processor is configured to acquire the first eye picture photographed by the first camera, and determine, according to the first eye picture, a position coordinate of a central point of a pupil corresponding to the user.

The embodiments of the present disclosure has the beneficial effects that: the head-mounted virtual reality device provided by the embodiments of the disclosure includes an eye movement recognition assembly and a processor, where the eye movement recognition assembly is used for eye movement recognition of the head-mounted virtual reality device; the eye movement recognition assembly comprises a light source assembly and a first camera; the light source assembly includes a light source and a diffractive optical element which disperses the light source into a plurality of rays; the light source and the diffractive optical element cooperate to emit light to form a first reflected pattern on a user's eyeball. Compared with the scheme that the eye movement recognition of the head-mounted virtual reality device is realized through cooperation of a plurality of infrared emitting diodes and an infrared camera, in the eye movement recognition scheme provided by the embodiments of the present disclosure, one eye corresponds to one light source and one diffractive optical element, so that number of light-emitting components used for the eye movement recognition is reduced, the occupied area of the light-emitting components on the circuit board is reduced, and the size of the circuit board used for installing the light-emitting components is further reduced. Therefore, the problem that the circuit board is exposed due to arrangement of the plurality of infrared emitting diodes is solved, and the number of the light-emitting components used for the eye movement recognition is reduced, so that the assembly of the light-emitting components can be facilitated, the assembly error of the light-emitting components is reduced, and the calibration accuracy of the eye movement recognition calibration in the head-mounted virtual reality device is increased. Furthermore, in view of the problem that the light emitted by the plurality of infrared emitting diodes interfere with each other, which affects the accuracy of the eye movement recognition, in the light source assembly provided by the embodiment of the present disclosure, the light source is dispersed into a plurality of rays through the diffractive optical element, so that the divergence of each ray is small, the mutual interference among the plurality of rays is reduced, thus the accuracy of the eye movement recognition is improved.

In a possible implementation, two lens barrel assemblies is further included, where the two lens barrel assemblies respectively correspond to two eyes of the user, and a virtual scene is displayed to the user by the two lens barrel assemblies when the head-mounted virtual reality device is used; and one lens barrel assembly corresponds to one eye movement recognition assembly, and in the lens barrel assembly and the eye movement recognition assembly that corresponded, the light source assembly and the first camera are both arranged below the lens barrel assembly.

In a possible implementation, a housing is further included, where the two lens barrel assemblies are arranged in the housing, and a first space for receiving glasses worn by the user is arranged between a first side of the housing and the lens barrel assemblies, where the first side of the housing is a side of the housing facing the user's eyes when the head-mounted virtual reality device is worn on the user's eyes;

two first cameras are arranged on the housing and are respectively located below two ends of the first space along a first direction, wherein the first direction is a direction of the central connecting line of the two lens barrel assemblies.

In a possible implementation, in the lens barrel assembly and the eye movement recognition assembly that corresponded, the light source assembly is located directly below a central axis of the lens barrel assembly and is arranged on the housing.

In a possible implementation, the two eye movement recognition assemblies respectively correspond to the two eyes of the user;

the processor obtains position coordinates of the central points of pupils of two eyes of the user respectively according to the first eye pictures of corresponding eyes respectively photographed by the two eye movement recognition assemblies; and the processor obtains an interpupillary distance according to the position coordinates of the center points of the pupils of the two eyes of the user.

In a possible implementation, the light source is a vertical-cavity surface-emitting laser.

In a possible implementation, both the vertical-cavity surface-emitting laser and the diffractive optical element have light-emitting surfaces;

a length and a width of the light-emitting surface of the vertical-cavity surface-emitting laser are 1 mm and 1 mm respectively;

a length and a width of the light-emitting surface of the diffractive optical element are 3.5 mm and 3.5 mm respectively, and the plurality of light-emitting holes are provided on the light-emitting surface of the diffractive optical element.

In a possible implementation, the light source assembly further comprises an outer housing, and the vertical-cavity surface-emitting laser and the diffractive optical element are arranged in the outer housing;

the outer housing has a first opening, the light-emitting surface of the diffractive optical element is arranged in the first opening, and a circumferential edge of the light-emitting surface of the diffractive optical element is attached to a circumferential edge of the first opening; and a length and a width of the outer housing at an end of the first opening are 3.6 mm and 3.6 mm, respectively.

In a possible implementation, the plurality of the light-emitting holes are enclosed to form a circular pattern.

In a possible implementation, field of view of the light source assembly is 40°-50°, and a distance that the light emitted by the light source assembly irradiates the eyeball of the user is 25 mm-27 mm.

In a possible implementation, a working current of the vertical-cavity surface-emitting laser is less than 5 mA.

In a possible implementation, diffraction efficiency of the diffractive optical element is less than 80%.

In a possible implementation, the eye movement recognition assembly further comprises a second camera, and in the lens barrel assembly and the eye movement recognition assembly that corresponded, the second camera is arranged above the lens barrel assembly and is located at a side close to the other lens barrel assembly; and the second camera is configured to photograph a second eye picture of the user when the head-mounted virtual reality device is used, and the second eye picture includes an area where an eyebrow of the user on the side corresponding to the second camera are located.

BRIEF DESCRIPTION OF DRAWINGS

The accompanying drawings, which are incorporated in and constitute a part of this specification, illustrate embodiments consistent with the disclosure and together with the description, serve to explain the principles of the disclosure.

DESCRIPTION OF REFERENCE NUMERALS 100, eye movement recognition assembly;
110, light source assembly; 120, first camera;
111, light source; 112, diffractive optical element; 113, outer housing;
1121, light-emitting hole;
200, lens barrel assembly;
310, display screen; 320, lens barrel; 330, convex lens;
300, second camera;
400, first reflected pattern;
500, glasses;
510, glasses frame; and
600, housing.

Through the above drawings, clear embodiments of the present disclosure have been illustrated, which will be described in more detail later. These drawings and written descriptions are not intended to limit the scope of the disclosed concepts in any way, but to explain the disclosed concepts to those skilled in the art by referring to specific embodiments.

DESCRIPTION OF EMBODIMENTS

As mentioned in the background, in the related art, an eye tracking apparatus of a head-mounted virtual reality device can determine a user's viewing direction and interpupillary distance according to the user's eye position. However, the eye tracking apparatus in the related art has the problems of high calibration complexity and low calibration accuracy. According to the research of the inventor, if the eye tracking apparatus of the head-mounted virtual reality device includes an infrared camera and a plurality of infrared emitting diodes, the plurality of infrared emitting diodes cooperate with the infrared camera to realize the eye movement recognition function of the head-mounted virtual reality device, so that the head-mounted virtual reality device can adjust its own IPD (Inter-pupillary Distance) value according to the interpupillary distance of the user. A plurality of infrared emitting diodes are arranged on a flexible printed circuit (FPC) board. Due to the limitation of the installation space inside the head-mounted virtual reality device, the flexible printed circuit board provided with the plurality of infrared emitting diodes cannot avoid a problem that the flexible printed circuit board is exposed, which further makes it prone to electrostatic interference when the user is using the head-mounted virtual reality device, resulting in functional damage of the head-mounted virtual reality device. On the other hand, the more the number of the infrared emitting diodes, the greater the overall error during assembly, thus affecting the calibration accuracy of the eye movement recognition of the head-mounted virtual reality device.

In view of this, embodiments of the present disclosure reduces the area occupied by light-emitting components on the circuit board by rearranging the light source assembly to reduce the number of light-emitting components used for the eye movement recognition, and further reduces the size of the circuit board used for installing light-emitting components, thereby solving the problem that the circuit board is exposed due to the arrangement of a plurality of infrared emitting diodes, and by reducing the number of light-emitting components used for the eye movement recognition, the assembly of light-emitting components is facilitated, the assembly error of light-emitting components is reduced, and the calibration accuracy during eye movement recognition calibration in the head-mounted virtual reality device is increased.

In the following, the technical scheme in the embodiments of the present disclosure will be clearly and completely described with reference to the attached drawings. Obviously, the described embodiment is only a part of the embodiments of the disclosure, but not the whole embodiments. Based on the embodiments in this present disclosure, all other embodiments obtained by those skilled in the art without creative labor belong to the protection scope of the present disclosure.

Figure 1:
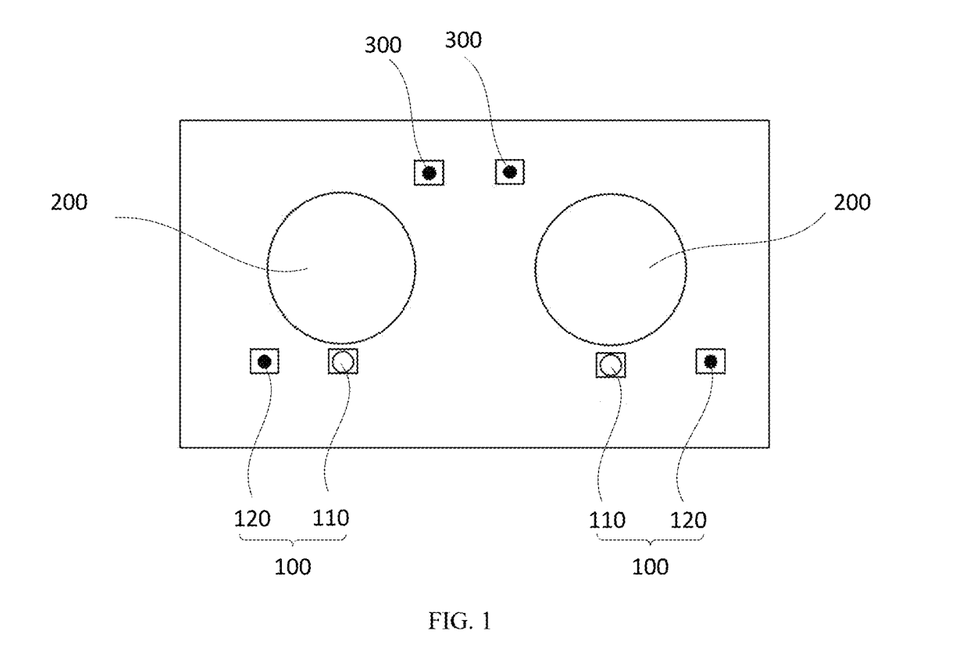
FIG. 1 is a schematic diagram of a head-mounted virtual reality device according to an embodiment of the present disclosure.
Figure 2:
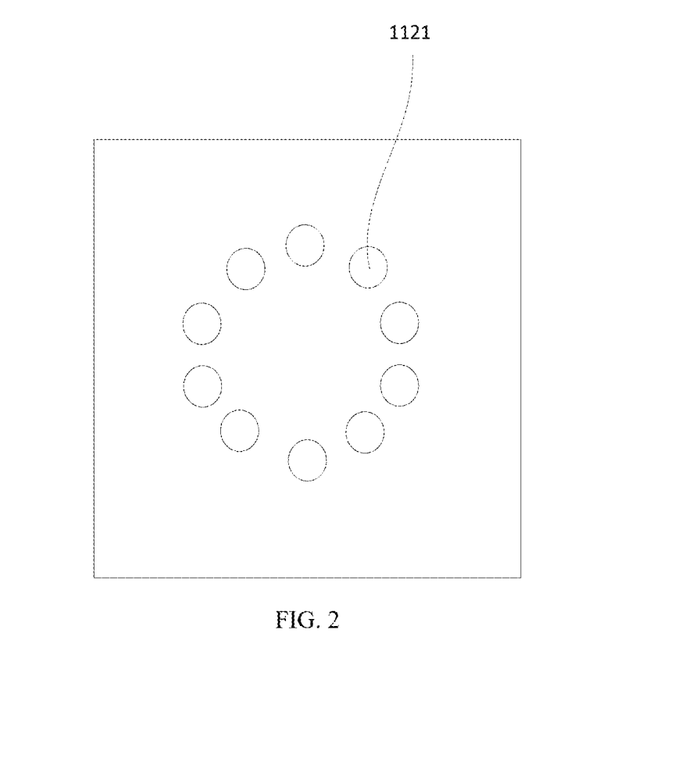
FIG. 2 is a schematic diagram of a light-emitting surface of a diffractive optical element according to an embodiment of the present disclosure.
Figure 3:
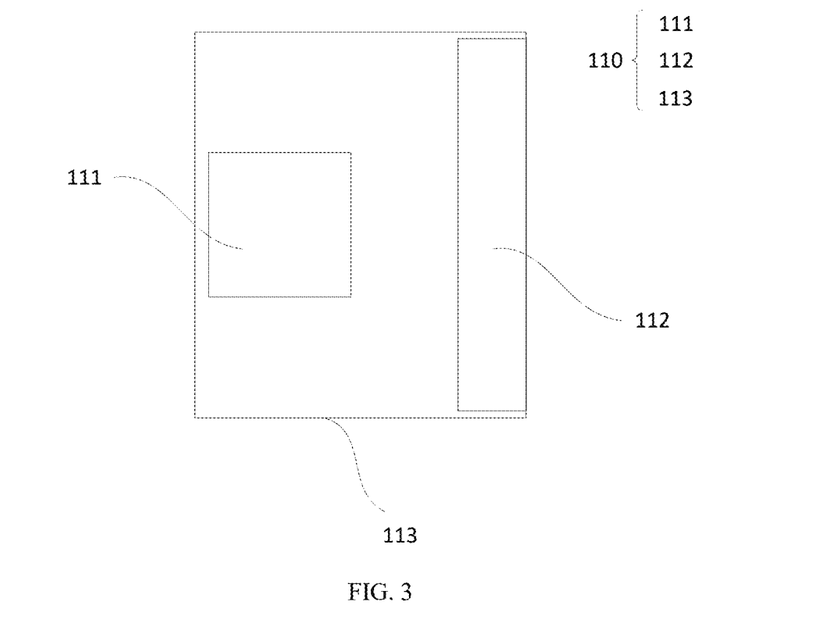
FIG. 3 is a schematic diagram of a light source assembly.
Figure 4:
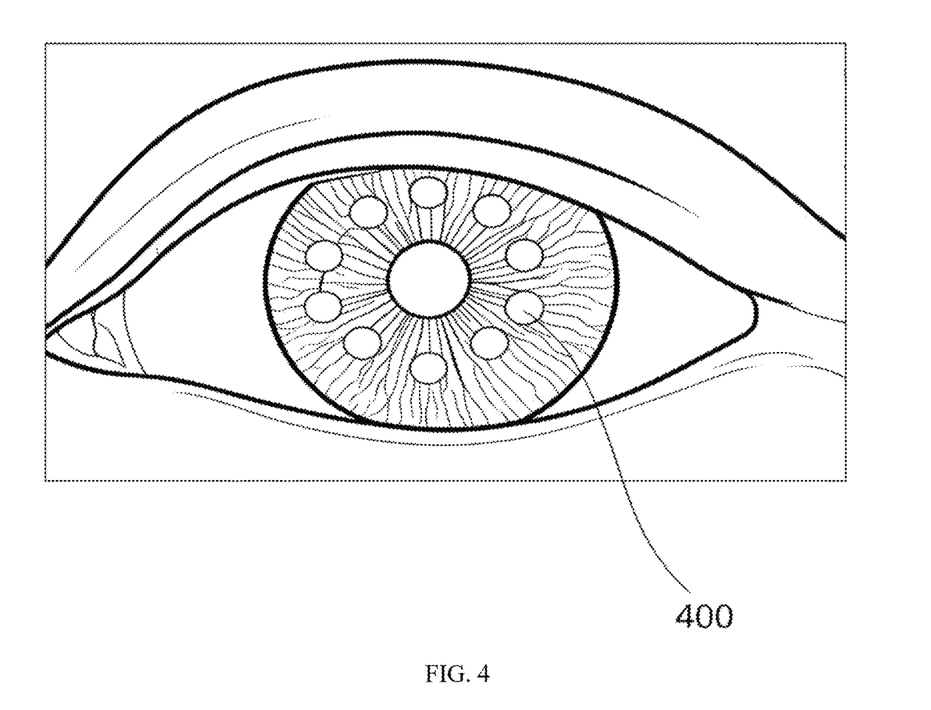
FIG. 4 is a schematic diagram of a light source assembly forming a first reflected pattern on a user's eyeball.
Figure 5:
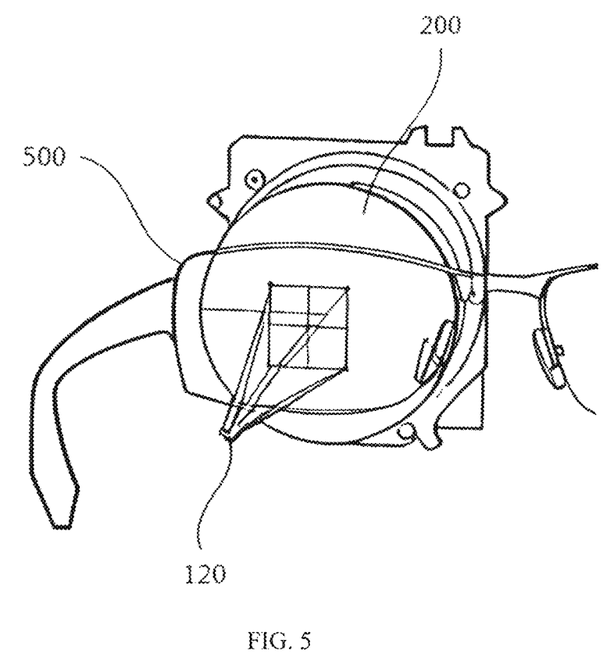
FIG. 5 is a ray diagram when a first camera is at a first position.
Figure 6:
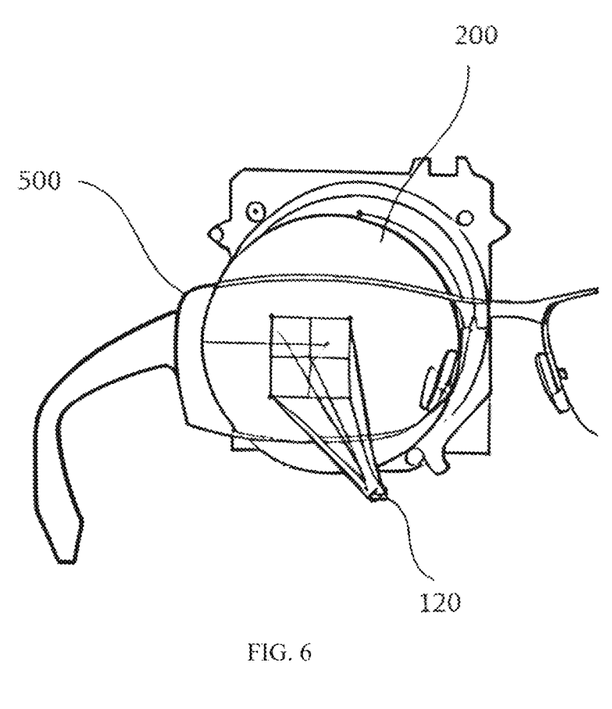
FIG. 6 is a ray diagram when the first camera is at a second position.
Figure 7:
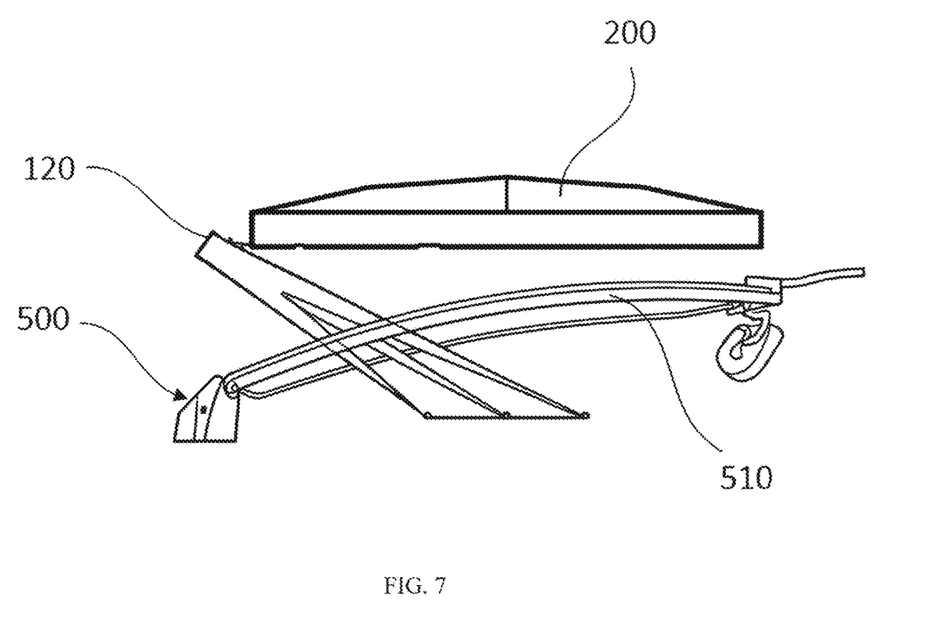
FIG. 7 is a ray diagram when the first camera is at a third position.
Figure 8:
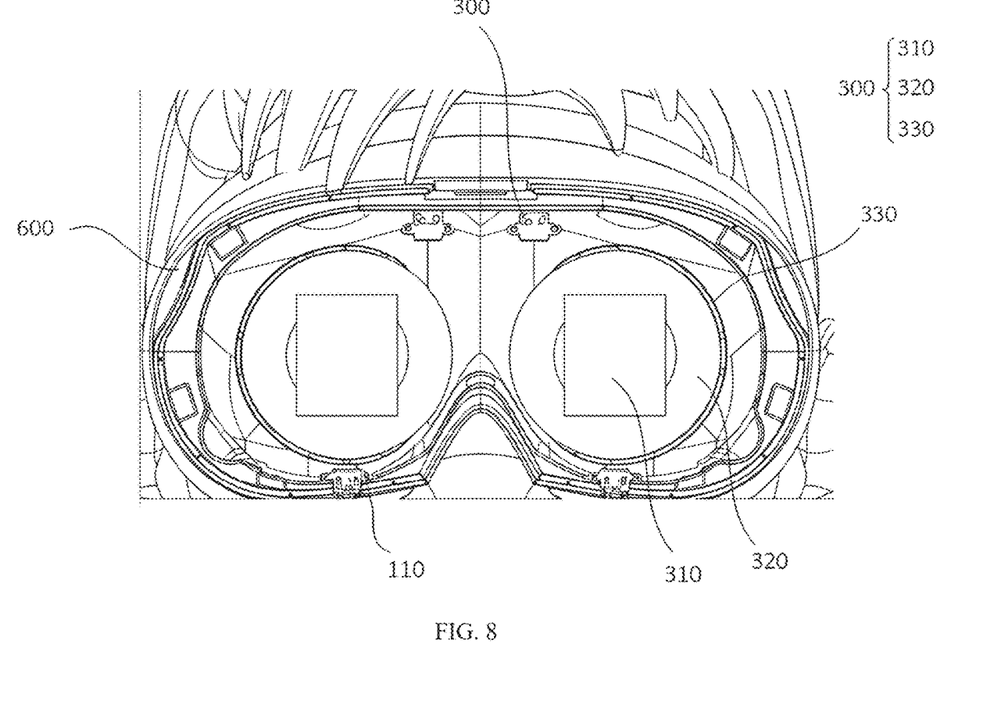
FIG. 8 is a front view of a user wearing a head-mounted virtual reality device provided by an embodiment of the present disclosure.
Figure 9:
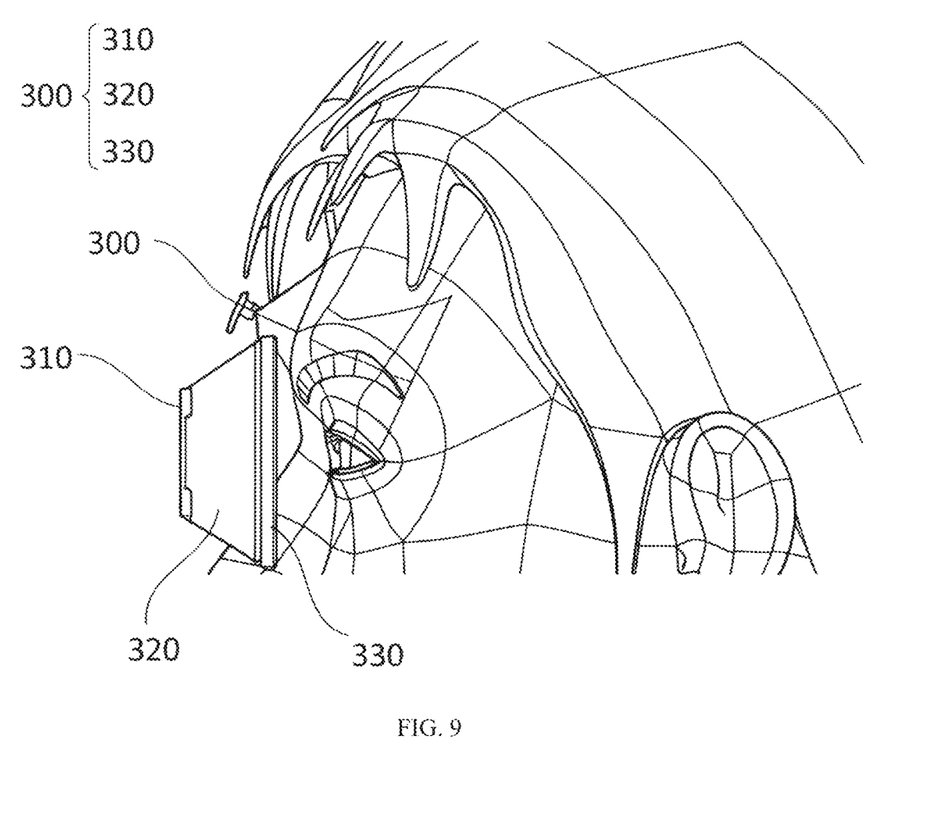
FIG. 9 is a side view of a user wearing the head-mounted virtual reality device provided by an embodiment of the present disclosure.
Figure 10:
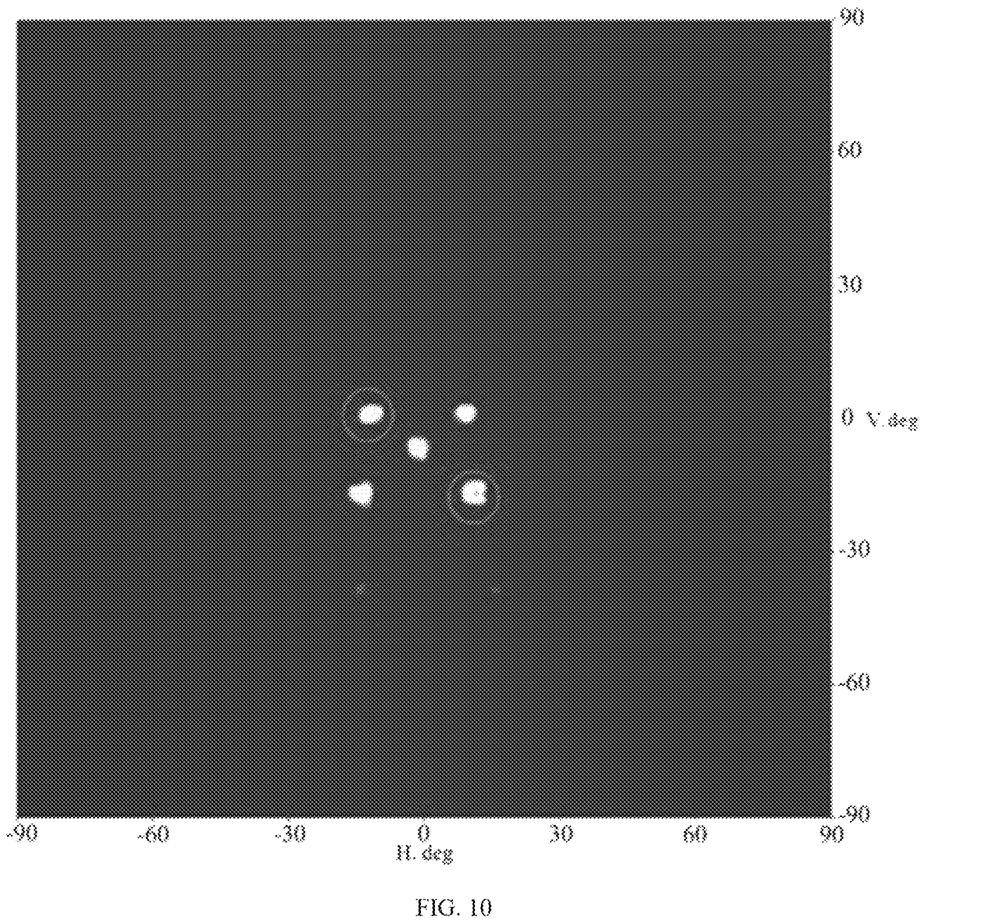
FIG. 10 is a simulation diagram of human eye spot with a small angle between light emitted by an IR LED module and a gaze direction.
Figure 11:
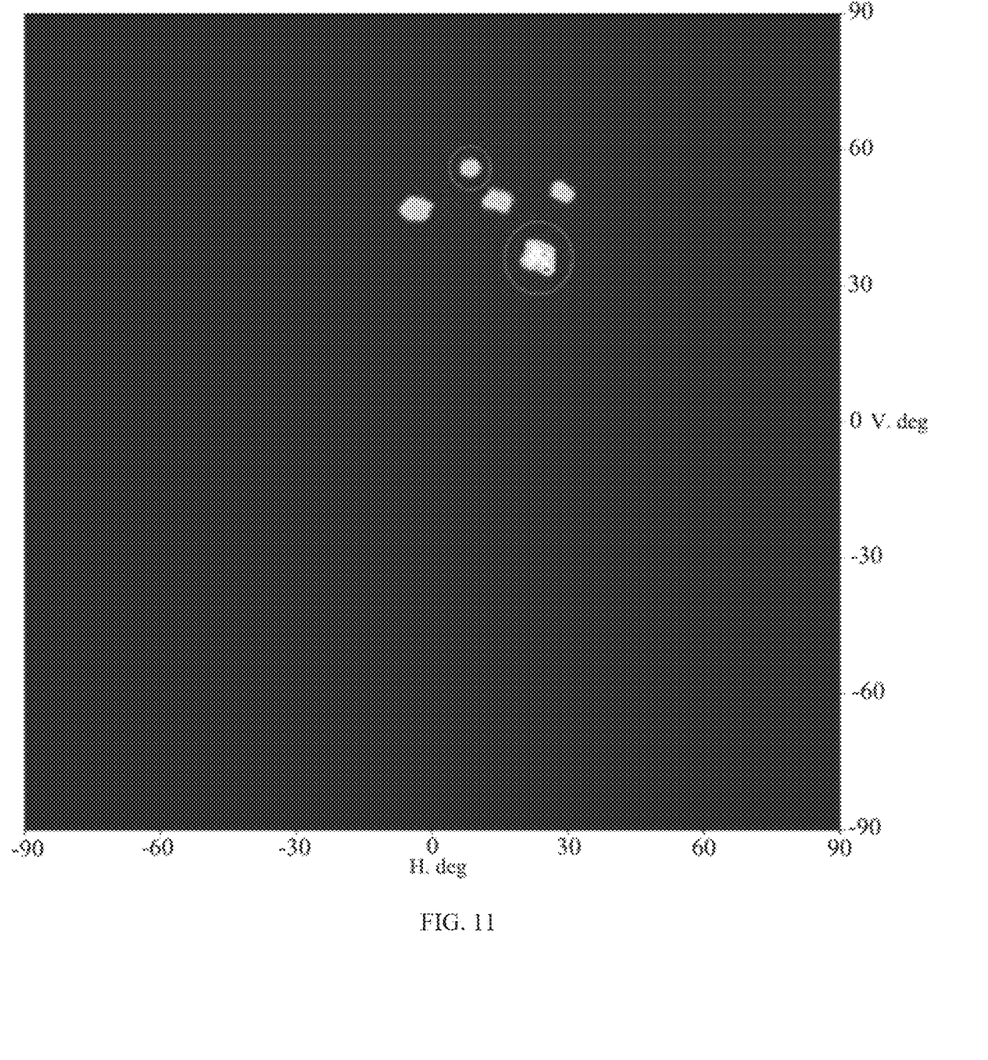
FIG. 11 is a simulation diagram of human eye spot with a large angle between light emitted by an IR LED module and the gaze direction.

FIG. 1 is a schematic diagram of a head-mounted virtual reality device according to an embodiment of the present disclosure; FIG. 2 is a schematic view of a light-emitting surface of a diffractive optical element according to an embodiment of the present disclosure; FIG. 3 is a schematic diagram of a light source assembly; FIG. 4 is a schematic diagram of a light source assembly forming a first reflected pattern on a user's eyeball; FIG. 5 is a ray diagram when a first camera is at a first position; FIG. 6 is a ray diagram when the first camera is at a second position; FIG. 7 is a ray diagram when the first camera is at a third position; FIG. 8 is a front view of a user wearing a head-mounted virtual reality device provided by an embodiment of the present disclosure; FIG. 9 is a side view of a user wearing a head-mounted virtual reality device provided by an embodiment of the present disclosure; FIG. 10 is a simulation diagram of human eye spot with a small angle between light emitted by an IR LED module and a gaze direction, and FIG. 11 is a simulation diagram of human eye spot with a large angle between light emitted by an IR LED module and a gaze direction.

As shown in FIG. 1, the head-mounted virtual reality device provided by the present embodiment includes an eye movement recognition assembly 100 and a processor. The eye movement recognition assembly 100 includes a light source assembly 110 and a first camera 120. As shown in FIG. 2, FIG. 3 and FIG. 4, the light source assembly 110 includes a light source 111 and a diffractive optical element 112. The diffractive optical element 112 has a plurality of light-emitting holes 1121, and the plurality of light-emitting holes 1121 form a first pattern. For example, the first pattern is a circular pattern formed by enclosing the plurality of light-emitting holes 1121, that is, the plurality of light-emitting holes 1121 are arranged around a central point, and the distance from a center of each light-emitting hole 1121 to the center point is the same.

The light source assembly 110 is configured such that when the head-mounted virtual reality device is used, the light emitted by the light source assembly 110 forms a first reflected pattern 400 on an eyeball of a user, and the first reflected pattern 400 is a reflected light spot formed on the eyeball of the user after the light emitted by the light source 111 irradiates the diffractive optical element 112, passes through the plurality of light-emitting holes 1121 of the diffractive optical element 112, and emits to the eyeball of the user. That is to say, the first reflected pattern 400 is a reflected light spot formed on the eyeball of the user as the light emitted by the light source assembly 110 emits to the eyeball of the user, and the reflected light spot corresponds to the first pattern formed by a combination of the plurality of light-emitting holes 1121.

Illustratively, the first reflected pattern 400 formed by the light source assembly 110 on a user's eyeball is as shown in FIG. 4.

In the embodiment, the first camera 120 is communicatively connected with the processor, and the first camera 120 is configured to photograph a first eye picture of a user when the head-mounted virtual reality device is used, and the first eye picture includes at least part of the first reflected pattern 400. The processor is configured to acquire the first eye picture photographed by the first camera 120, and determine, according to the first eye picture, a position coordinate of the central point of the pupil corresponding to the user. That is to say, the head-mounted virtual reality device provided by the embodiment of the present disclosure has an eye movement recognition function.

In the related art, the head-mounted virtual reality device realize the eye movement recognition function of the head-mounted virtual reality device with the cooperation of the plurality of infrared emitting diodes and the infrared camera, so that the head-mounted virtual reality device can adjust its own IPD value according to the interpupillary distance of the user, that is to say, infrared emitting diodes are light-emitting components used for the eye movement recognition. When a plurality of light-emitting components are arranged on a flexible printed circuit board, a large space is occupied, however, due to the limitation of the installation space inside the head-mounted virtual reality device, the flexible printed circuit board provided with the plurality of the light-emitting components cannot avoid the problem that the flexible printed circuit board is exposed, which further makes it prone to electrostatic interference when the user is using the head-mounted virtual reality device, resulting in functional damage of the head-mounted virtual reality device. Moreover, the more the number of the light-emitting components, the greater the overall error during assembly, thus affecting the calibration accuracy of the eye movement recognition of the head-mounted virtual reality device. In the head-mounted virtual reality device provided by the embodiments of the present disclosure, the light-emitting components for realizing the eye movement recognition function are a light source 111 and a diffractive optical element 112, and the light emitted by the light source 111 is dispersed into a plurality of rays through the diffractive optical element 112, and the plurality of rays is incident on the user's eyeball to form a first reflected pattern 400 on the user's eyeball. Therefore, compared with the scheme that the eye movement recognition of the head-mounted virtual reality device is realized through cooperation of a plurality of infrared emitting diodes and an infrared camera, the head-mounted virtual reality device provided by the embodiments of the present disclosure reduces the number of light-emitting components used for eye movement recognition, reduces the occupied area of the light-emitting components on the circuit board, and further reduces the size of the circuit board used for installing the light-emitting components. Therefore, the problem that the circuit board is exposed due to the arrangement of the plurality of infrared emitting diodes is solved, and the number of light-emitting components used for eye movement recognition is reduced, which can facilitate the assembly of the light-emitting components, reduce assembly error of the light-emitting components, and increase calibration accuracy of eye movement recognition calibration in the head-mounted virtual reality device. Furthermore, in view of the problem that light emitted by the plurality of infrared emitting diodes interfere with each other, which affects the accuracy of eye movement recognition, the light source assembly 110 provided by the embodiments of the present disclosure disperses the light source 111 into a plurality of rays through the diffractive optical element 112, so that the divergence of each ray is small, the mutual interference among the plurality of rays is reduced, and the accuracy of eye movement recognition is improved.

In the embodiments, the head-mounted virtual reality device further includes two lens barrel assemblies 200, which respectively correspond to the two eyes of the user, and when the head-mounted virtual reality device is used, the two lens barrel assemblies 200 present a virtual scene to the user. That is, one of the lens barrel assemblies 200 corresponds to the user's left eye to present a virtual scene to the user's left eye, and the other lens barrel assembly 200 corresponds to the user's right eye to present a virtual scene to the user's right eye. In this embodiment, one lens barrel assembly 200 corresponds to one eye movement recognition assembly 100. In the lens barrel assembly 200 and the eye movement recognition assembly 100 that corresponded, the light source assembly 110 and the first camera 120 are both arranged below the lens barrel assembly 200.

In some embodiments of the present disclosure, two eye movement recognition assemblies 100 correspond to the two eyes of a user respectively, and the processor obtains the position coordinates of the central points of the pupils of the two eyes of the user respectively according to the first eye pictures of the corresponding eyes photographed by the two eye movement recognition assemblies 100, respectively, and then the processor obtains the interpupillary distance according to the position coordinates of the central points of the pupils of the two eyes of the user. That is to say, the head-mounted virtual reality device provided by the embodiment of this disclosure has the eye movement recognition function, and the head-mounted virtual reality device provided by the embodiments of the present disclosure obtains the user's interpupillary distance by analyzing the user's eye movement, and then adjusts its own IPD value according to the user's interpupillary distance.

In an embodiment, the two lens barrel assemblies 200 are a first lens barrel assembly and a second lens barrel assembly, the eye movement recognition assembly 100 corresponding to the first lens barrel assembly is a first eye movement recognition assembly, and the eye movement recognition assembly 100 corresponding to the second lens barrel assembly is a second eye movement recognition assembly, where the first eye movement recognition assembly is arranged below the first lens barrel assembly and the second eye movement recognition assembly is arranged below the second lens barrel assembly. And the first eye movement recognition assembly and the second eye movement recognition assembly are in a mirror arrangement relative to the first plane, so that the angle at which the first camera 120 of the first eye movement recognition assembly photographs the first eye picture is the same as the angle at which the first camera 120 of the second eye movement recognition assembly photographs the first eye picture, which is beneficial to the accuracy of the analysis result of the processor, that is, the accuracy of eye movement recognition can be higher, and the calculated IPD value can be more accurate.

As shown in FIG. 8 and FIG. 9, the lens barrel assembly 200 includes a lens barrel 320, and a display screen 310 and a convex lens 330 arranged at both sides of the lens barrel 320 along the axial direction of the lens barrel 320, where the display screen 310 is arranged on the side of the lens barrel 320 away from the user's eyes, and the convex lens 330 is arranged on the side of the lens barrel 320 facing the user's eyes.

As shown in FIG. 8, the head-mounted virtual reality device further comprises a housing 600, the two lens barrel assemblies 200 are arranged in the housing 600, and a first space for receiving glasses 500 worn by a user is arranged between a first side of the housing 600 and the lens barrel assemblies 200, and the first side of the housing 600 is a side of the housing 600 facing the user's eyes when the head-mounted virtual reality device is worn. That is, the head-mounted virtual reality device provided by embodiments of the present disclosure can be adapted to users wearing the glasses 500, thus improving the experience of users wearing the glasses 500.

It is worth noting that the glasses 500 worn by the user can be myopia glasses 500, hyperopia glasses 500 and presbyopic glasses.

In an embodiment, the first camera 120 is an eye-tracking (Eye-Tracking, ET) camera.

In order to avoid a situation that the edges of the glasses 500 worn by the user blocks the first camera 120 from photographing the first reflected pattern 400 formed on the user's eyeball by the light source assembly 110, that is, to prevent the edges of the glasses 500 worn by the user from blocking the reflected light spot formed on the user's eyeball by the light source assembly 110 when the first camera 120 photographs the first eye picture, the first cameras 120 of the two eye movement recognition assemblies 100 are arranged on the housing 600 and located at the lower parts of both ends of the first space along the first direction, with the first direction being a direction of a line connecting center points of the two lens barrel assemblies 200. That is, as shown in FIG. 1 and FIG. 7, when the head-mounted virtual reality device is worn on the user's eyes, the first eye movement recognition assembly corresponds to the user's left eye, and the first camera 120 of the first eye movement recognition assembly is arranged on the housing 600 and is located below the left edge of the frame 510 of the user's glasses 500. This arrangement enables that when the first camera 120 photographs the reflected light spot formed by the light source component 110 on the user's eyeball, the reflected light spot formed on the user's eyeball by the light source assembly 110 is not blocked by the edge of the glasses 500 worn by the user. Thus, the accuracy of eye movement recognition of the head-mounted virtual reality device is improved.

For example, as shown in FIG. 5, if the first camera 120 is arranged at the lower left of the left lens of the glasses 500 worn by the user, when the first camera 120 photographs a first eye picture, the edge of the glasses 500 worn by the user will block the reflected light spot formed on the user's eyeball by the light source assembly 110, causing the edge of the glasses 500 worn by the user to interfere with the first camera 120 photographing the first reflected pattern 400. Similarly, as shown in FIG. 6, if the first camera 120 is located at the lower right of the left lens of the glasses 500 worn by the user, that is, at the lower left of the user's nose, when the first camera 120 photographs the first eye picture, the edge of the glasses 500 worn by the user will also block the reflected light spot formed on the user's eyeball by the light source assembly 110, causing the edge of the glasses 500 worn by the user to interfere with the first camera 120 photographing the first reflected pattern 400.

It is worth noting that FIG. 5 is a ray diagram when the first camera 120 is at a first position, FIG. 6 is a ray diagram when the first camera 120 is at the second position, and FIG. 7 is a ray diagram when the first camera 120 is at the third position, where the first position is at the left lower of the left lens of the user's glasses 500 and is located at the edge of the housing 600 when the head-mounted virtual reality device is worn on the user's eyes. The second position is at the right lower of the left lens of the user's glasses 500 and is located at the edge of the housing 600 when the head-mounted virtual reality device is worn on the user's eyes. The third position is below the left edge of the lens frame 510 of the user's glasses 500 and is located at the edge of the housing 600 when the head-mounted virtual reality device is worn on the user's eyes.

In the embodiments of the present disclosure, as shown in FIG. 1 and FIG. 8, in the lens barrel assembly 200 and the eye movement recognition assembly 100 that corresponded, the light source assembly 110 is located directly below the central axis of the lens barrel assembly 200 and is arranged on the housing 600. That is, as shown in FIG. 1 and FIG. 8, the light source assembly 110 of the first eye movement recognition assembly is arranged below the first lens barrel assembly, and is located directly below the central axis of the first lens barrel assembly. Accordingly, as the first eye movement recognition assembly and the second eye movement recognition assembly are in a mirror arrangement relative to the first plane, the light source assembly 110 of the second eye movement recognition assembly is arranged below the second lens barrel assembly, and is located directly below the central axis of the second lens barrel assembly. This arrangement can ensure that the size and the brightness of each reflected light spot formed by the light source assembly 110 on the user's eyeball have the highest consistency, which is beneficial to improving the accuracy of eye movement recognition.

As shown in FIG. 10 and FIG. 11, FIG. 10 is a simulation diagram of human eye spot with a small angle between light emitted by an IR LED module and a gaze direction, and FIG. 11 is a simulation diagram of human eye spot with a large angle between light emitted by the IR LED module and the gaze direction, where the IR LED module includes five IR LEDs, and the five IR LEDs irradiate the human eye and form five light spots on the human eyes, and the gaze direction is the direction at which the human eye faces the front, and FIG. 10 and FIG. 11 are simulation diagram that the camera photographs the five light spots formed on the human eyes. As can be seen from FIG. 10 and FIG. 11, comparing a case that light emitted by the IR LED module has a small angle with the gaze direction with a case that the light emitted by the IR LED module has a large angle with the gaze direction, the size and brightness of the five light spots formed on the human eye and photographed by the camera are of better consistent when the light emitted by the IR LED module has a small angle with the gaze direction. Similarly, it can be inferred that in the embodiments of the present disclosure, when the light source assembly 110 is arranged at a position where the light emitted by the light source assembly 110 forms a small angle with the gaze direction of the human eye, the size and brightness of each reflected light spot formed on the user's eyeball are in better consistency. When the light source assembly 110 of the first eye movement recognition assembly is arranged below the first lens barrel assembly and is located directly below the central axis of the first lens barrel assembly, the light source assembly 110 is arranged at a position where the light emitted by the light source assembly 110 forms a smaller angle with the gaze direction of the human eye compared with angles formed when the light source assembly 110 is arranged at other positions, therefore, when the light source assembly 110 of the first eye-catching recognition assembly is arranged below the first lens barrel assembly and is located directly below the central axis of the first lens barrel assembly, the size and brightness of each reflected light spot formed by the light source assembly 110 on the user's eyeball are in better consistency.

As the center point position of a pupil of the user's left eye and the center point position of a pupil of the user's right eye is acquired with calculation by the processor based on the acquired first eye picture photographed by the first eye movement recognition assembly and the first eye picture photographed by the second eye movement recognition assembly in combination with pre-designed eye movement recognition algorithm, an arrangement that the first camera 120 of the first eye movement recognition assembly is located at the lower part of one end of the first space along the first direction and the light source assembly 110 of the first eye movement recognition assembly is arranged below the first lens barrel assembly and is located directly below the central axis of the first lens barrel assembly can ensure that the first reflected pattern 400 photographed by the first camera 120 is not blocked by the edge of the glasses 500 worn by the user, and the size and brightness of each reflected light spot formed by the light source assembly 110 on the user's eyeball are in highest consistency. Together, the accuracy of eye movement recognition is greatly improved.

It is worth noting that the eye movement recognition algorithm in the embodiments of the present disclosure is the same as the eye movement recognition algorithm in the related art, and in scheme of the related art, a plurality of infrared emitting diodes cooperate with an infrared camera to realize eye movement recognition of a head-mounted virtual reality device, the details of which are not repeated here.

In some embodiments of the present disclosure, the light source 111 is a vertical-cavity surface-emitting laser, which can emit stable and continuous high-quality laser light, and the laser light is dispersed into a plurality of rays through the diffractive optical element 112 to form the first reflected pattern 400 on the user's eyeball. The cooperation of the vertical-cavity surface-emitting laser and the diffractive optical element 112 can replace the plurality of infrared emitting diodes in the related art, and the small number of light-emitting components and the low mutual interference between the rays is beneficial to improving the accuracy of the eye movement recognition.

In an embodiment, the working current of the vertical-cavity surface-emitting laser is less than 5 mA, and the diffraction efficiency of the diffractive optical element 112 is less than 80%. This above settings can meet the requirements of human eye safety on the premise that the light source assembly 110 can emit light.

In some embodiments of the present disclosure, both the vertical-cavity surface-emitting laser and the diffractive optical element 112 have light-emitting surfaces, the length and width of the light-emitting surfaces of the vertical-cavity surface-emitting laser are 1 mm and 1 mm respectively, and the length and width of the light-emitting surfaces of the diffractive optical element 112 are 3.5 mm and 3.5 mm respectively, and a plurality of light-emitting holes 1121 are arranged on the light-emitting surfaces of the diffractive optical element 112.

As shown in FIG. 3, in order to facilitate the assembly of the vertical-cavity surface-emitting laser and the diffractive optical element 112, the light source assembly 110 further comprises an outer housing 113, where the vertical-cavity surface-emitting laser and the diffractive optical element 112 are arranged in the outer housing 113, and the outer housing 113 has a first opening, the light-emitting surface of the diffractive optical element 112 is arranged in the first opening, and the circumferential edge of the light-emitting surface of the diffractive optical element 112 is attached to the circumferential edge of the first opening. The length and width of the outer housing 113 at an end of the first opening are 3.6 mm and 3.6 mm, respectively. This arrangement can reduce the volume of the light source assembly 110 as much as possible, and prevent the light source assembly 110 from occupying too much space in the head-mounted virtual reality device and affecting the performance of the head-mounted virtual reality device. The arrangement that the light-emitting surface of the diffractive optical element 112 is arranged at the first opening, and the circumferential edge of the light-emitting surface of the diffractive optical element 112 is attached to the circumferential edge of the first opening can avoid the influence of the housing 600 on the light emitted from the diffractive optical element 112.

In an embodiment, the field of view of the light source assembly 110 is 40°-50°, and the distance when the light emitted by the light source assembly 110 irradiates the user's eyeball is 25-27 mm, which can meet the requirements of the head-mounted virtual reality device that the distance of exit pupil is 15 mm-18 mm and the projection area is a circular area with a diameter of 10 mm-12 mm.

In some embodiments of the present disclosure, the eye movement recognition assembly 100 further includes a second camera 300. In the lens barrel assembly 200 and the eye movement recognition assembly 100 that corresponded, the second camera 300 is arranged above the lens barrel assembly 200 and at the side close to the other lens barrel assembly 200. The second camera 300 is configured such that when the head-mounted virtual reality device is used, a second eye picture of the user is photographed by the second camera 300, and the second eye picture includes the area where the eyebrows of the user on a side corresponding to the second camera 300 are located.

When two eye movement recognition assemblies 100 are arranged corresponding to the lens barrel assemblies 200, the second camera 300 of the eye movement recognition assembly 100 corresponding to the user's left eye is used to photograph a second eye picture of the user's left eye, and the second eye picture includes the user's left eyebrow, and the second camera 300 of the eye movement recognition assembly 100 corresponding to the user's right eye is used to photograph a second eye picture of the user's right eye, and the second eye picture includes the user's right eyebrow. As facial expressions of human can be reflected by mouth and eyebrows, the setting of the two second cameras 300 can photograph the user's facial images and realize expression tracking function. On the other hand, the setting of the two second cameras 300 can also photograph the user's eye images to provide a 3D reconstruction function.

In an embodiment, in the two second cameras 300, the second camera 300 of the first eye movement recognition assembly is arranged above the first lens barrel assembly at a side close to the second lens barrel assembly, and the two second cameras 300 are in mirror arrangement with respect to the first plane. This position can capture the user's eyebrow information and eye information in a more comprehensive way.

Among them, the terms "above" and "below" are used to describe relative positional relationship of various structures in the drawings, which is only to facilitate the clarity of description, and are not used to limit the applicable scope of this disclosure. The change or adjustment of the relative relationship without substantially changing the technical content should also be regarded as the applicable scope of the present disclosure.

It should be noted that, in the present disclosure, unless otherwise specified and limited, the first feature "above" or "below" the second feature may be considered that the first feature and the second feature are in direct contact, or the first feature and the second feature are in indirect contact through intermediary. Moreover, the first feature is "above", "on the top of" and "on" the second feature could mean that the first feature is directly above or obliquely above the second feature, or just means that the horizontal height of the first feature is higher than the second feature. The first feature is "under", "below" and "beneath" the second feature can mean that the first feature is directly or obliquely below the second feature, or just means that the horizontal height of the first feature is smaller than the horizontal height of the second feature.

In addition, in the present disclosure, unless otherwise specified and limited, the terms "installation", "be joined with", "connect" and "fix" should be understood in a broad way, for example, it can be in fixed connection, detachable connection or could be integrated; it could be directly connected, can also be indirectly connected through an intermediary, and can be the internal connection of two elements or the interaction between the two elements. For those skilled in the art, the specific meanings of the above terms in the present disclosure can be understood according to specific situations.

In the description of this specification, descriptions referring to the terms "one embodiment", "some embodiments", "exemplary embodiments", "examples", "specific examples" or "some examples" mean that specific features, structures, materials or characteristics described in connection with this embodiment or example are included in at least one embodiment or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

Finally, it should be explained that the above embodiments are only used to illustrate the technical scheme of this disclosure, but not to limit it; Although the present disclosure has been described in detail with reference to the foregoing embodiments, it should be understood by those skilled in the art that the technical scheme described in the foregoing embodiments can still be modified, or some or all of its technical features can be replaced by equivalents; However, these modifications or substitutions do not make the essence of the corresponding technical solutions deviate from the scope of the technical solutions of various embodiments of the present disclosure.

The invention claimed is:

1. A head-mounted visual reality device, comprising an eye movement recognition assembly and a processor, wherein the eye movement recognition assembly comprises a light source assembly and a first camera;
   the light source assembly comprises a light source and a diffractive optical element, wherein the diffractive optical element is provided with a plurality of light-emitting holes, a first pattern is formed by the plurality of light-emitting holes, and the light source assembly is configured such that a first reflected pattern on an eyeball of a user is formed by light emitted by the light source assembly when the head-mounted virtual reality device is used;
   the first camera is configured to photograph a first eye picture of the user when the head-mounted virtual reality device is used, and the first eye picture comprises at least part of the first reflected pattern; and
   the processor is configured to acquire the first eye picture photographed by the first camera, and determine, according to the first eye picture, a position coordinate of a central point of a pupil corresponding to the user.

2. The head-mounted virtual reality device according to claim 1, further comprising two lens barrel assemblies, wherein the two lens barrel assemblies respectively correspond to two eyes of the user, and a virtual scene is displayed to the user by the two lens barrel assemblies when the head-mounted virtual reality device is used;
   one lens barrel assembly corresponds to one eye movement recognition assembly, and in the lens barrel assembly and the eye movement recognition assembly that corresponded, the light source assembly and the first camera are both arranged below the lens barrel assembly.

3. The head-mounted virtual reality device according to claim 2, further comprising a housing, wherein the two lens barrel assemblies are arranged in the housing, and a first space for receiving glasses worn by the user is arranged between a first side of the housing and the lens barrel assemblies, wherein the first side of the housing is a side of the housing facing the user's eyes when the head-mounted virtual reality device is worn on the user's eyes;
   two first cameras are arranged on the housing and are respectively located below two ends of the first space along a first direction, wherein the first direction is a direction of the central connecting line of the two lens barrel assemblies.

4. The head-mounted virtual reality device according to claim 3, wherein in the lens barrel assembly and the eye movement recognition assembly that corresponded, the light source assembly is located directly below a central axis of the lens barrel assembly and is arranged on the housing.

5. The head-mounted virtual reality device according to claim 2, wherein the two eye movement recognition assemblies respectively correspond to the two eyes of the user;
   the processor is configured to obtain position coordinates of the central points of pupils of the two eyes of the user respectively according to the first eye pictures of corresponding eyes respectively photographed by the two eye movement recognition assemblies; and
   the processor is configured to obtain an interpupillary distance according to the position coordinates of the center points of the pupils of the two eyes of the user.

6. The head-mounted virtual reality device according to claim 1, wherein the light source is a vertical-cavity surface-emitting laser.

7. The head-mounted virtual reality device according to claim 2, wherein the light source is a vertical-cavity surface-emitting laser.

8. The head-mounted virtual reality device according to claim 3, wherein the light source is a vertical-cavity surface-emitting laser.

9. The head-mounted virtual reality device according to claim 4, wherein the light source is a vertical-cavity surface-emitting laser.

10. The head-mounted virtual reality device according to claim 5, wherein the light source is a vertical-cavity surface-emitting laser.

11. The head-mounted virtual reality device according to claim 6, wherein both the vertical-cavity surface-emitting laser and the diffractive optical element have light-emitting surfaces;
    a length and a width of the light-emitting surface of the vertical-cavity surface-emitting laser are 1 mm and 1 mm respectively;
    a length and a width of the light-emitting surface of the diffractive optical element are 3.5 mm and 3.5 mm respectively, and the plurality of light-emitting holes are provided on the light-emitting surface of the diffractive optical element.

12. The head-mounted virtual reality device according to claim 11, wherein the light source assembly further comprises an outer housing, and the vertical-cavity surface-emitting laser and the diffractive optical element are arranged in the outer housing;
    the outer housing has a first opening, the light-emitting surface of the diffractive optical element is arranged in the first opening, and a circumferential edge of the light-emitting surface of the diffractive optical element is attached to a circumferential edge of the first opening; and
    a length and a width of the outer housing at an end of the first opening are 3.6 mm and 3.6 mm, respectively.

13. The head-mounted virtual reality device according to claim 6, wherein the plurality of the light-emitting holes are enclosed to form a circular pattern.

14. The head-mounted virtual reality device according to claim 13, wherein field of view of the light source assembly is 40°-50°, and a distance that the light emitted by the light source assembly irradiates the eyeball of the user is 25 mm-27 mm.

15. The head-mounted virtual reality device according to claim 6, wherein a working current of the vertical-cavity surface-emitting laser is less than 5 mA.

16. The head-mounted virtual reality device according to claim 15, wherein diffraction efficiency of the diffractive optical element is less than 80%.

17. The head-mounted virtual reality device according to claim 2, wherein the eye movement recognition assembly further comprises a second camera, and in the lens barrel assembly and the eye movement recognition assembly that corresponded, the second camera is arranged above the lens barrel assembly and is located at a side close to the other lens barrel assembly; and     the second camera is configured to photograph a second eye picture of the user when the head-mounted virtual reality device is used, and the second eye picture comprises an area where an eyebrow of the user on the side corresponding to the second camera are located.

\* \* \* \* \*